United States Patent

[11] 3,590,643

[72] Inventor Walter M. Posingies
  Edina, Minn.
[21] Appl. No. 866,310
[22] Filed Oct. 14, 1969
[45] Patented July 6, 1971
[73] Assignee Honeywell Inc.
  Minneapolis, Minn.

[54] FLUID VORTEX ANGULAR MOTION SENSOR
  10 Claims, 4 Drawing Figs.
[52] U.S. Cl. ................................................. 73/505
[51] Int. Cl. ................................................. G01p 3/26
[50] Field of Search ......................................... 73/505,
  194; 137/81.5

[56] References Cited
  UNITED STATES PATENTS
3,276,259 10/1966 Bowles et al. ................ 73/194
3,285,073 11/1966 Egli ............................ 73/505

Primary Examiner—James J. Gill
Attorneys—Charles J. Ungemach, Ronald T. Reiling and Charles L. Rubow ABSTRACT: Fluid vortex apparatus including a vortex chamber, a characterized coupling element comprising a stack of spaced annular discs for introducing fluid into the vortex chamber, and a fluid outlet from the vortex chamber. The coupling element is characterized so that different portions of the fluid are introduced into the vortex chamber at different distances from the outlet, and are thus subject to different transfer characteristics in traversing the chamber. The annular discs in the coupling element are separated by predetermined small distances chosen to provide great viscous coupling between the discs and the fluid flowing therebetween. A sensor associated with the outlet passage produces a signal indicative of a summation of the modifications to rotational velocity of flow about the axis of the outlet, thereby resulting in a characterized response to input stimuli.

INVENTOR.
WALTER M. POSINGIES

BY Ronald T. Reiling

ATTORNEY

INVENTOR.
WALTER M. POSINGIES

FLUID VORTEX ANGULAR MOTION SENSOR

BACKGROUND OF THE INVENTION

This invention pertains to fluid vortex apparatus, and more particularly to integrating vortex rate sensing instruments having viscous coupling means.

A vortex rate sensor is a fluidic device which is sensitive to changes in angular velocity (rate of turn) about an axis. It contains no essential moving structural parts. Change in angular velocity of a vortex rate sensor about its sensitive axis results in modification of a fluid flow field therewithin. The modification is sensed to provide a rate signal.

Structurally, a vortex rate sensor generally comprises housing means enclosing a chamber having a central axis and a fluid outlet from the chamber generally extending along the axis. Fluid permeable coupling means is provided at the periphery of the chamber for introducing fluid thereinto so that it has substantially no rotational velocity relative to the housing. A flow sensor is associated with the fluid outlet. The flow sensor provides a signal indicative of rotational velocity of fluid in the outlet relative to the housing.

In operation, a fluid source provides fluid flow into the vortex chamber through the coupling means. In the absence of a rate input to the sensor, fluid flow through the vortex chamber approximates two dimensional pure sink flow. Such fluid flow has no angular velocity about the sensor axis relative to the sensor housing. When the sensor is subjected to a rate input about its sensitive axis, the coupling means functions to produce the same angular velocity in the fluid flowing therethrough. Since there is relatively little coupling between the housing and the fluid within the vortex chamber the fluid acquires a rotational velocity relative to the housing after leaving the coupling means. Due to the principle of conservation of angular momentum, the rotational flow velocity increases as the fluid approaches the central outlet. Thus, rotational velocity is superimposed on the radial velocity and a spiral fluid flow field is produced.

A flow sensor or signal pickoff associated with the fluid outlet produces a signal indicative of the rotational velocity of fluid flowing therethrough. Since the rotational velocity of fluid in the outlet varies with rate input to the vortex rate sensor about its sensitive axis, the signal from the pickoff is indicative of rate input.

Rate signals are required in all aircraft flight control systems as well as in many other applications. Due to the inherent simplicity and potential for ruggedness, reliability and low cost of fluidic devices, vortex rate sensors have found frequent application in control systems, particularly where extreme environments are encountered. A control system requiring a rate signal frequently requires a signal indicative of some predetermined characterized function of pure rate. For example, certain aircraft flight control systems have been found to require a signal indicative of rate plus lagged rate about an axis. In many cases the desired predetermined function of rate cannot be produced by a conventional prior art vortex rate sensor alone for the following reasons. In a prior art vortex rate sensor, assuming that there is no coupling between the sensor housing and the fluid within the vortex chamber after it leaves the coupling means, amplification of the angular velocity of the fluid is substantially only dependent on the difference in diameters of the coupling means and the fluid outlet. Consequently, a vortex device can be said to have a gain which is dependent on the difference in these diameters.

Another characteristic of a vortex device is its time response. Since fluid entering the vortex chamber from the coupling means and any fluid in the chamber require finite times to pass from the chamber to the signal pickoff, the effect of the rate input will not be immediately apparent at the pickoff. Further, the full effect of a rate input will not be apparent at the pickoff until time sufficient for fluid entering the vortex chamber from the coupling means to reach the pickoff has elapsed. Thus, the time response of a vortex device is dependent on the transit time required for fluid to pass from the coupling means to the signal pickoff. The transit time is basically dependent on the diameter of the coupling element and the radial velocity at which fluid enters the vortex chamber. Radial velocity is dependent on the pressure differential across the device and the impedance to fluid flow offered by the coupling element, assuming all other flow impedances to be negligible.

Accordingly, every vortex device has associated therewith a signal transfer characteristic, comprising a gain factor and a time response factor, which is basically dependent on the device configuration. Further, both the gain and the time response are basically dependent on the geometry (particularly diameter) of the vortex chamber. Since the gain and time response of a given prior art device cannot be varied independently, latitude in varying the transfer characteristic of such a device is limited.

One prior art solution to the problem of generating signals indicative of particular rate functions, such as angular rate plus lagged angular rate, has been to process a pure rate signal, such as can be generated by a prior art vortex rate sensor, in a signal shaping network. However, this approach is undesirable since it requires the use of a signal shaping network in addition to a basic rate sensor.

A second problem experienced with prior art vortex rate sensors arises from the coupling means used therein. Typically, prior art sensors utilize coupling means which provide a very large number of individual passages randomly distributed around the periphery of the vortex chamber. Structurally, this may be achieved by utilizing a sintered metal or ceramic coupling ring. In such coupling means, any bias associated with individual passages is theoretically averaged out because of the very large number of such passages.

However, it has been determined that the principle of statistically averaging a large number of small random biases breaks down in smaller diameter rate sensors. This results in a null shift or a null instability. In addition, prior art coupling means contribute to noise in rate sensor operation. Specifically, sintered metal coupling rings provide individual passages wherein the fluid velocity may be several orders of magnitude greater than the average velocity of fluid flow through the vortex chamber, thereby generating noise in the fluid flow.

A third problem pertaining to prior art vortex rate sensors has been physical size. In view of the previous discussion, it can be seen that if a given application requires a vortex rate sensor having a predetermined gain and/or other signal transfer characteristics, the diameter of the vortex chamber is essentially fixed in prior art device. A vortex chamber of this diameter is then surrounded by a coupling ring which, in turn, is surrounded by a supply plenum. Accordingly, the overall diameter of a prior art sensor is substantially larger than the diameter required for the vortex chamber. This relatively large overall diameter frequently exceeds the maximum size requirements allowed for such a sensor. Further, even in applications where a small sensor package is not an absolute requirement, a smaller size is often desirable.

SUMMARY OF THE INVENTION

The applicant's invention is a vortex device capable of sensing angular rate and producing a signal indicative of any one of a wide range of functions of that angular rate. Apparatus according to the applicant's invention comprises a housing enclosing a vortex chamber having a central axis and a fluid outlet from the vortex chamber. Fluid permeable viscous coupling means comprising a stack of spaced annular discs is provided for introducing fluid into the vortex chamber so that it has substantially no rotational velocity relative to the housing. The coupling means is further characterized by a range of diameters adjacent to the vortex chamber so that portions of the fluid introduced into the chamber are affected by substantially different transfer characteristics in passing through the coupling means and the chamber to the fluid outlet.

The coupling means may be coextensive with the vortex chamber along the central axis so as to surround the chamber, and so that fluid flows radially inward through the coupling means into the chamber. Alternately, the coupling means may be axially displaced from the vortex chamber so that fluid flows radially outward from the coupling means, and then into the vortex chamber, thereby providing for a smaller overall diameter of the sensor package.

Sensing means is also provided for producing a signal indicative of a summation of the rotational velocities of the fluid relative to the housing, such velocities being acquired by portions of the fluid in response to input stimuli.

DESCRIPTION OF THE PREFERRED EMBODIMENTS

Figure 1:
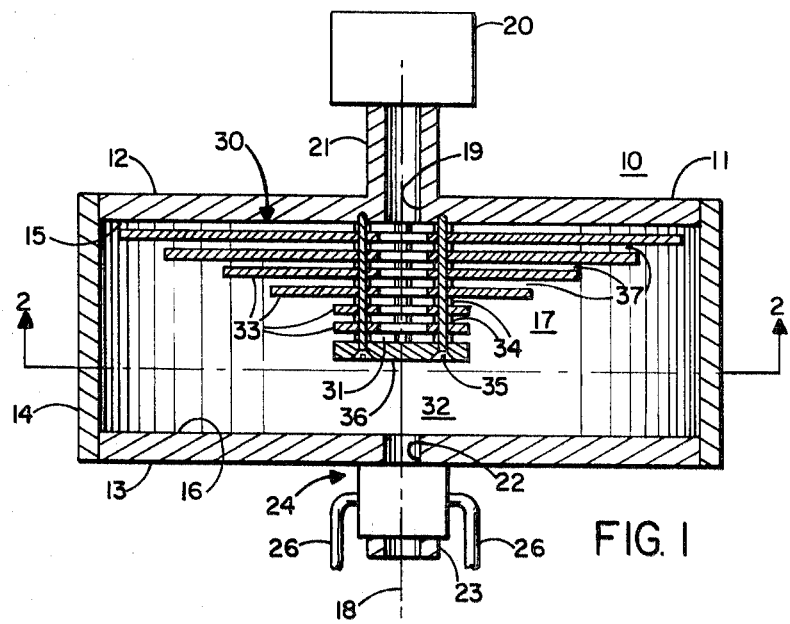
FIG. 1 is a sectional view taken along lines 1-1 in FIG. 2 of one embodiment of a vortex device in accordance with the applicant's invention wherein the coupling element is axially displaced from the vortex chamber.
Figure 2:
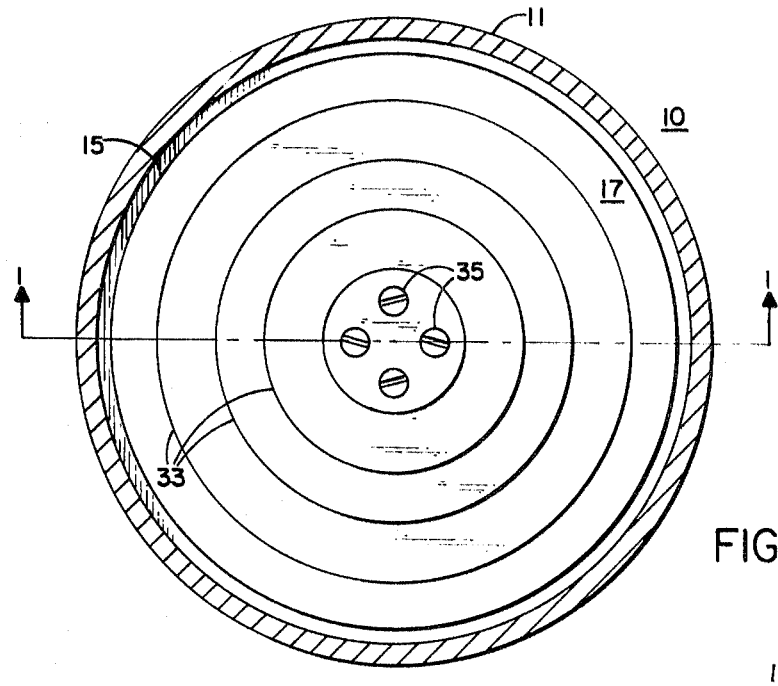
FIG. 2 is a sectional view of the embodiment of the applicant's invention shown in FIG. 1 taken along lines 2-2.

Reference numeral 10 generally identifies one embodiment of the applicant's invention shown in FIGS. 1 and 2. Sensor 10 includes a housing 11 comprising a first plate member 12, a second plate member 13, and a tubular cylindrical member 14. Members 12 and 13 have planar surfaces 15 and 16 respectively thereon. Members 12 and 13 are spaced apart by member 14 so that surfaces 15 and 16 are maintained in a parallel relationship. Members 12, 13 and 14 cooperate to enclose a cylindrical cavity 17 which is symmetrical about a central axis 18.

Member 11 is provided with a central aperture 19 for admitting fluid into cavity 17. Aperture 19 is supplied with fluid under pressure from a source 20 through a conduit 21. Member 13 is also provided with a central aperture 22 for exhausting fluid from cavity 17. A fluid outlet passage 23 communicates with aperture 22.

A signal pickoff 24 is associated with fluid outlet 23. Signal pickoff 24 may be of any one of a number of well known types commonly used with vortex devices. Pickoff 24 may comprise a blade element extending at least partially across outlet passage 23, and oriented so that the chord thereof is aligned with axis 18. A plurality of pressure ports (not shown) are associated with the blade element for sensing the pressure differential thereacross. Pressures developed in the pressure ports are transmitted to any suitable utilization apparatus (not shown) by means of conduits 26. In operation, pressure signals indicative of the angle of attack of fluid on the blade, and hence indicative of the rotational velocity of fluid in passage 23, are produced in conduits 26. Thus, the pressures in conduits 26 are indicative of rate input to sensor 10.

Coupling means generally identified by reference numeral 30 separates cavity 17 into a plenum chamber 31 in communication with fluid inlet aperture 19, and a vortex chamber 32 in communication with fluid outlet aperture 22. Coupling means 30 comprises a plurality of annular discs 33 which are stacked one upon the other and spaced apart by spacers 34. Annular discs 33 are substantially coaxial with axis 18 and have different diameters adjacent to vortex chamber 32. Spacers 34 are angularly spaced around axis 18. Annular discs 33 and spacers 34 are fixed in position by means of fasteners 35. An end cap 36, which serves to prevent flow into chamber 32 along axis 18 is also fixed in place by fasteners 35.

Thus, coupling means 30 provides a plurality of narrow, elongated apertures 37 through which fluid may flow radially outward and into vortex chamber 32. The spacing between discs 33 is chosen so as to provide the desired viscous coupling between coupling means 30 and the fluid flowing therethrough. An appropriate spacing between discs 33 provides that fluid is introduced into the vortex chamber so that it has substantially no rotational velocity relative to housing 11. Further, the different diameters of discs 33 adjacent to chamber 32 provide that fluid is introduced thereinto at different radii so that different portions of the fluid follow different paths to outlet aperture 22.

In operation, a pressure differential exists between inlet aperture 19 and outlet aperture 22. Thus, fluid flows through coupling means 30 and vortex chamber 32 to outlet aperture 22. In the absence of a change in angular velocity of sensor 10 about axis 18, fluid flow through vortex chamber 32 has substantially no rotational component about the axis relative to housing 11. If the angular velocity of sensor 10 about axis 18 is varied, a rotational component of flow relative to housing 11 is impressed on the fluid flowing through chamber 32. Under such conditions, fluid flowing through chamber 32 has superimposed radial and rotational components, and the fluid follows spiral flow paths from coupling means 32 to outlet aperture 22. As a result of the requirement for conservation of angular momentum, the rotational flow velocity about axis 18 increases as the fluid approaches the outlet. Specifically, the rotational flow velocity varies inversely with distance from the outlet.

Figure 3:
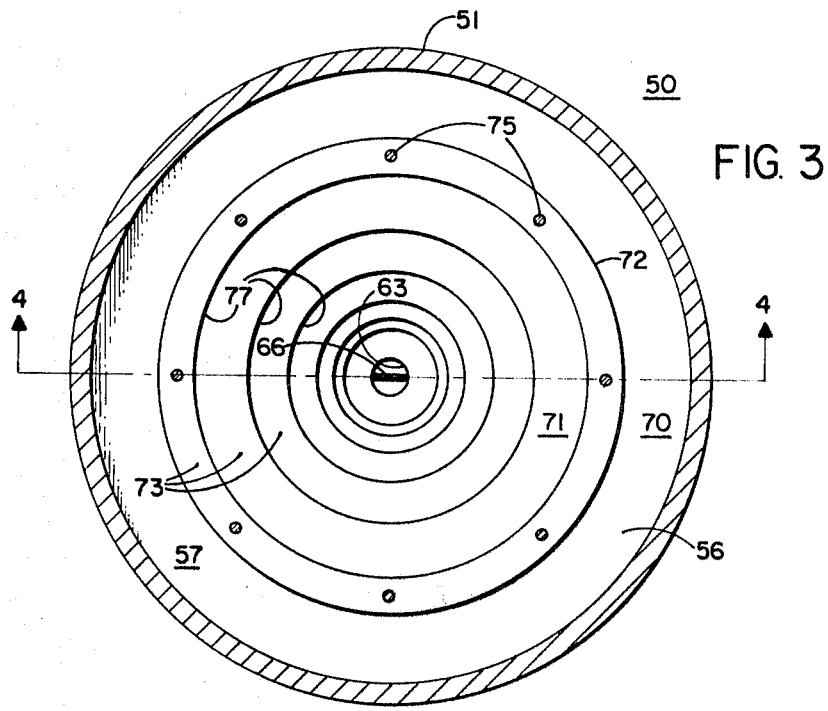
FIG. 3 is a sectional plan view taken along lines 3-3 in FIG. 4 of a second embodiment of a vortex device in accordance with the applicant's invention wherein the coupling element is coextensive with the vortex chamber along its central axis.
Figure 4:
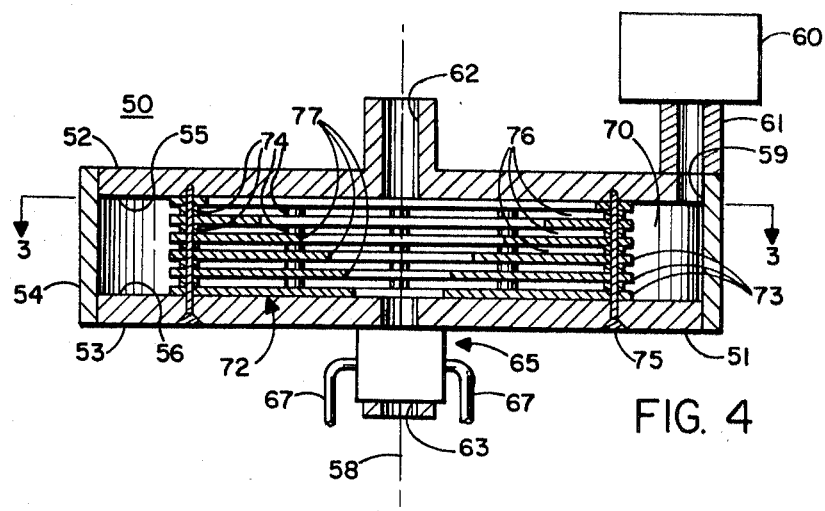
FIG. 4 is a sectional view of the embodiment of the applicant's invention shown in FIG. 3 taken along lines 4-4.

Referring now to FIGS. 3 and 4, reference numeral 50 generally identifies a second embodiment of a vortex rate sensor in accordance with the applicant's invention. Sensor 50 includes a housing 51 comprising first and second plate members 52 and 53 and a tubular member 54. Members 52 and 53 have planar surfaces 55 and 56 thereon respectively. Members 52 and 53 are spaced apart by member 54 and positioned such that surfaces 55 and 56 are substantially parallel. Members 52, 53 and 54 cooperate to enclose a cavity 57 which is substantially symmetrical about an axis 58. A fluid inlet 59 communicates with cavity 57 at its periphery. Fluid inlet 59 is supplied with fluid under pressure from a source 60 through a conduit 61. A pair of centrally located fluid outlets 62 and 63 in members 52 and 53 respectively also communicate with cavity 57. A signal pickoff generally identified by reference numeral 65 is associated with fluid outlet 63. Signal pickoff 65 senses the flow pattern within outlet 63 and produces a signal indicative of the rotational component of flow about axis 58 relative to housing 51.

Signal pickoff 65 may be of any one of a number of well known types of pickoffs utilized with vortex devices. Pickoff 65 is illustrated as of the type comprising a blade member 66 (shown in FIG. 1) extending at least partially across outlet 63 and oriented so that a chord thereof is aligned with axis 58. A plurality of pressure ports (not shown) are associated with blade member 66, and are connected to any suitable utilization apparatus through conduits 67. In operation, pressure signals indicative of the angle of attack of fluid on blade member 66, and hence indicative of the rotational velocity of fluid in passage 63, are produced in conduits 67. Thus, the pressures in conduits 67 are indicative of the rate input to sensor 50.

Cavity 57 is separated into a plenum chamber 70 and a vortex chamber 71 by fluid permeable coupling means 72. Coupling means 72 comprises a plurality of annular discs 73 which are stacked one upon the other and spaced apart by spacers 74. Annular discs 73 are substantially coaxial with axis 58 and have different diameters adjacent to chamber 71. Spacers 74 are angularly spaced around axis 58. Annular discs 73 and spacers 74 are fixed in position by means of fasteners 75.

Thus, coupling means 72 provides a plurality of narrow, elongated apertures 76 through which fluid flows radially inward into vortex chamber 71. The spacing between discs 73 is chosen so as to provide the desired viscous coupling between coupling means 72 and the fluid flowing therethrough. An appropriate spacing between discs 73 provides that fluid is introduced into vortex chamber 71 so that it has substantially no rotational velocity relative to housing 51. Further, the different diameters of discs 73 (indicated by reference numeral 77) adjacent to vortex chamber 71 provide that fluid is introduced into the chamber at different radii.

To facilitate describing the overall operation of the applicant's invention, sensors 10 and 50 can each be visualized as comprising a large number of hypothetical conventional vortex devices, each connected to supply its output signal to a common outlet and signal pickoff. Each hypothetical sensor has a vortex chamber of a given diameter, namely the diameter of the coupling means adjacent to the vortex chamber in a given plane perpendicular to its central axis of symmetry. Each of these hypothetical sensors has its own associated signal transfer characteristic including a gain factor and a time response factor. The gains associated with the individual hypothetical sensors increase as the diameters of the sensors increase. In addition, the time lags provided by the individual hypothetical sensors increase as the sensor diameters increase. Accordingly, the transfer characteristic of the actual sensors can be tailored by combining the proper numbers of hypothetical devices of each characteristic.

For example, it may be desired that upon application of a step rate input, the output signal will rapidly rise to a substantial percentage of its final value, and then gradually increase until the final value is reached. Such a response is characteristic of the rate plus lagged rate signal previously mentioned in connection with aircraft flight control systems. A vortex rate sensor having such a response can be provided by utilizing the coupling element which is characterized so as to simulate a large number of small diameter, fast response, low gain sensors and a smaller number of larger diameter, slower response, higher gain sensors. To accomplish this, a substantial portion of the discs in the coupling means have relatively small diameters adjacent to the vortex chamber. Combined with these discs are a smaller number of discs of larger diameters adjacent to the vortex chamber as illustrated in both the embodiments shown in FIGS. 1, 2 and FIGS. 3, 4. This general design may be viewed as embodying a plurality of hypothetical sensors operating in parallel.

In accordance with the foregoing discussion, different portions of the fluid flowing through sensors 10 and 50 are affected buy different transfer characteristics before reaching the fluid outlets. Specifically, fluid flowing through portions of the coupling elements having larger diameters adjacent to the vortex chambers acquire a large rotational velocity about the central axes relative to the sensor housings before reaching the fluid outlets. The same portions of fluid require relatively long period of time to reach the fluid outlets so that this large rotational velocity is not present at the signal pickoffs for a relatively long time after the input stimulus from which it resulted. Conversely, fluid flowing through the portions of the coupling element having smaller diameters adjacent to the vortex chambers acquire a relatively small rotational velocity in response to a rate input, but the effect therefrom is present at the signal pickoffs after a very short lapse of time.

It is also pointed out that the previously described operation results in different portions of the fluid following different paths from the coupling elements to the fluid outlets. Specifically, the larger the radius at which the fluid enters the vortex chamber, the greater the rotational component acquired by the fluid while in the chamber. By taking different paths from the coupling means to the fluid outlets, portions of the fluid following the different paths are affected by different transfer characteristics.

The applicant has also discovered that the different effects produced in different portions of the fluid as the result of an input rate are integrated or summed at the signal pickoff so that the signal produced thereby is indicative of a summation of the modifications to the flow paths followed by the different portions of the fluid. Thus, the signal produced by the pickoff is indicative of the composite effects produced by the sensor on individual portions of the fluid flowing therethrough, and is indicative of a particular function of the rate imposed on the sensor.

In accordance with the foregoing description, it can be seen that the applicant has disclosed simple fluidic means for sensing angular rate about an axis and providing a signal indicative of a predetermined function of the angular rate. This method has inherent versatility since the particular function can be varied as desired over a wide range by appropriately characterizing the coupling element. Further, the applicant's unique coupling means provides substantial improvement in null stability over prior art sensors. Also, this coupling means results in reduced noise in sensor operation. Finally, the applicant has disclosed a sensor embodiment wherein the size of the sensor package has been minimized by axially displacing the coupling element from the vortex chamber. Although two specific embodiments are shown in detail, these embodiments are only exemplary. A variety of other structural features in accordance with the applicant's contemplation and teaching will be apparent to those skilled in the art.

What I claim is:

1. In a fluid vortex device including a housing defining a fluid inlet, a vortex chamber having a central axis, a fluid outlet from the vortex chamber, and sensing means associated with the fluid outlet, said sensing means operable to produce a signal indicative of the rotational velocity of fluid in the fluid outlet about the axis, the improvement which comprises:

fluid permeable coupling means fixed to said housing separating the fluid inlet from the vortex chamber, said coupling means comprising a plurality of annular discs substantially coaxial with the central axis, each of said annular discs separated from adjacent ones of said annular discs by predetermined small distances so as to provide a plurality of thin annular passages for fluid flow between the fluid inlet and the vortex chamber, said annular discs having different diameters adjacent to the vortex chamber so as to introduce different portions of the fluid from the fluid inlet into the vortex chamber at different radii, thereby causing the different fluid portions to be affected by different transfer characteristics in passing through the vortex chamber, said predetermined small distances being chosen to provide great viscous coupling between said annular discs and the fluid flowing therebetween, whereby angular movement of said housing about the axis imparts angular velocity to the flow of fluid through the vortex chamber.

2. The vortex device of claim 1 wherein said coupling means and said vortex chamber are coextensive along the central axis, said coupling means surrounding the vortex chamber, so that fluid flows from the fluid inlet, radially inward through said coupling means into the vortex chamber.

3. The vortex device of claim 1 wherein said coupling means is axially displaced from the vortex chamber so that fluid flows from the fluid inlet, radially outward through said coupling means into the vortex chamber.

4. Fluid vortex apparatus comprising:

housing means defining a plenum chamber having a fluid inlet, a vortex chamber having a central axis and a fluid outlet from the vortex chamber;

coupling means permeable to fluids separating the plenum chamber from the vortex chamber, said coupling means comprising a plurality of substantially parallel annular discs fixed to said housing means concentric with the central axis, each of said annular discs spaced from adjacent ones of said annular discs by predetermined small distances so as to provide a plurality of elongated apertures for fluid flow into the vortex chamber, different ones of said plurality of annular discs having different diameters adjacent to the vortex chamber so that portions of the fluid are introduced into the vortex chamber at different radii and are thereby affected by different transfer characteristics in passing through the coupling element and vortex chamber to the fluid outlet, the predetermined small distances being chosen to provide great viscous coupling between said plurality of annular discs and the fluid flowing therebetween, thereby introducing fluid into the vortex chamber so that it has substantially no rotational velocity relative to said housing means, fluid in the vortex chamber acquiring a rotational velocity relative to said housing means in response to changes in rotation of said housing means about the central axis; and sensing means operable to produce a signal indicative of the rotational velocity of the fluid in the outlet about the axis, the rotational velocity of the fluid in the outlet being indicative of the summation of the rotational velocities acquired by the portions of the fluid while in the vortex chamber.

5. The vortex apparatus of claim 4 wherein said coupling means and said vortex chamber are coextensive along the central axis, said coupling means surrounding the vortex chamber, so that fluid flows from the fluid inlet, radially inward through said coupling means into the vortex chamber.

6. The vortex apparatus of claim 4 wherein said coupling means is axially displaced from the vortex chamber so that fluid flows from the fluid inlet, radially outward through said coupling means into the vortex chamber.

7. Fluid vortex apparatus sensitive to changes in angular velocity about an axis comprising:
a housing enclosing a cylindrical cavity, said housing comprising a first member having a fluid inlet port therein, a second member having a fluid outlet port therein and a third member having a cylindrical opening therethrough, said third member connecting and maintaining said first and said second members in a spaced relationship, said first, second and third members cooperating to form said cavity, said fluid inlet and said fluid outlet each communicating with said cavity;
coupling means fixed to said housing within said cavity about said axis, said coupling means separating said cavity into a plenum chamber in communication with the fluid inlet and a vortex chamber in communication with the fluid outlet, said coupling means comprising a stack of annular discs spaced so as to provide a plurality of elongated apertures for fluid flow into the vortex chamber, different ones of said plurality of annular discs having different diameters adjacent to the vortex chamber so that portions of the fluid are introduced into the vortex chamber at different radii and are thereby affected by different transfer characteristics in passing through said coupling element and the vortex chamber to the fluid outlet, spacing between adjacent ones of said plurality of annular discs being chosen to provide great viscous coupling between said discs and the fluid flowing therebetween, thereby introducing fluid into the vortex chamber so that it has substantially no rotational velocity relative to said housing means, fluid in the vortex chamber acquiring a rotational velocity relative to said housing means in response to changes in rotation of said housing means about the central axis; and sensing means associated with the fluid outlet, said sensing means operable to produce a signal indicative of the rotational velocity of fluid in the fluid outlet about the axis.

8. The vortex apparatus of claim 7 wherein said coupling means and said vortex chamber are coextensive along the central axis, said coupling means surrounding the vortex chamber, so that fluid flows from the fluid inlet radially inward through said coupling means into the vortex chamber.

9. The vortex apparatus of claim 7 wherein said coupling means is axially displaced from the vortex chamber so that fluid flows from the fluid inlet, radially outward through said coupling means into the vortex chamber.

10. The vortex apparatus of claim 7 wherein the spacing between adjacent ones of said plurality of annular discs varies with axial extent of said coupling means along the central axis.